(12) United States Patent
Cunningham et al.

(10) Patent No.: US 6,259,719 B1
(45) Date of Patent: Jul. 10, 2001

(54) SATURABLE BRAGG REFLECTORS FOR USE IN MODE-LOCKING LASERS

(75) Inventors: John E. Cunningham, Lincroft; Wayne H. Knox, Holmdel, both of NJ (US)

(73) Assignee: Lucent Technologies, Murray Hill, NJ (US)

( * ) Notice: Subject to any disclaimer, the term of this patent is extended or adjusted under 35 U.S.C. 154(b) by 0 days.

(21) Appl. No.: 09/358,112

(22) Filed: Jul. 21, 1999

(51) Int. Cl.[7] .............................. H01S 3/098; H01S 3/113
(52) U.S. Cl. .................................. 372/99; 372/6; 372/18
(58) Field of Search ................................ 372/18, 99, 92, 372/98, 6, 11; 359/839, 840, 248

(56) References Cited

U.S. PATENT DOCUMENTS

| | | | |
|---|---|---|---|
| 5,627,854 | * 5/1997 | Knox ........................................ | 372/99 |
| 5,701,327 | * 12/1997 | Cunningham et al. ................ | 372/99 |
| 5,901,162 | * 5/1999 | Alcock et al. ......................... | 372/18 |
| 5,987,049 | * 11/1999 | Weingarten et al. ................... | 372/18 |
| 6,072,811 | * 6/2000 | Fermann et al. ........................ | 372/11 |

* cited by examiner

Primary Examiner—James W. Davie

(57) ABSTRACT

A saturable Bragg reflector for use in mode locking a laser comprises a stack alternately of layers of a high index of refraction and layers of a low index of refraction. The layers of high index all have optical thicknesses of about one quarter the operating wavelength of the laser. The layers of low index, except for the pair of uppermost layers, have optical thicknesses of a quarter the operating wavelength but that pair have a thickness of about one eighth of a wavelength. A quantum well is located near the center of the layer of high index between the pair of one eighth wavelength. Such a reflector is used as one end of a resonant cavity that houses a gain medium.

12 Claims, 2 Drawing Sheets

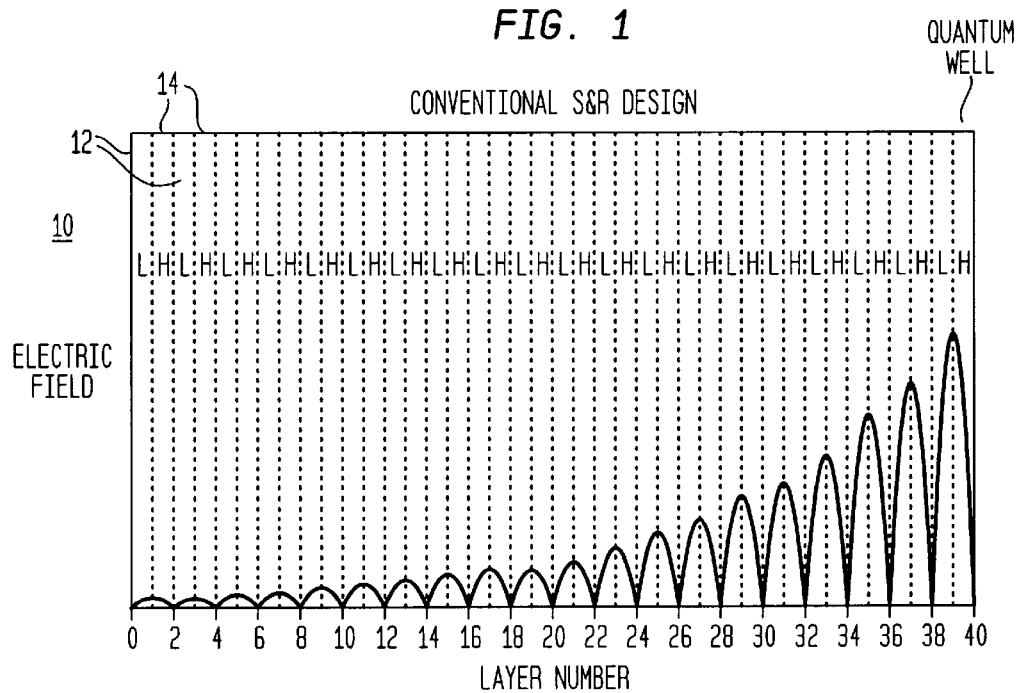
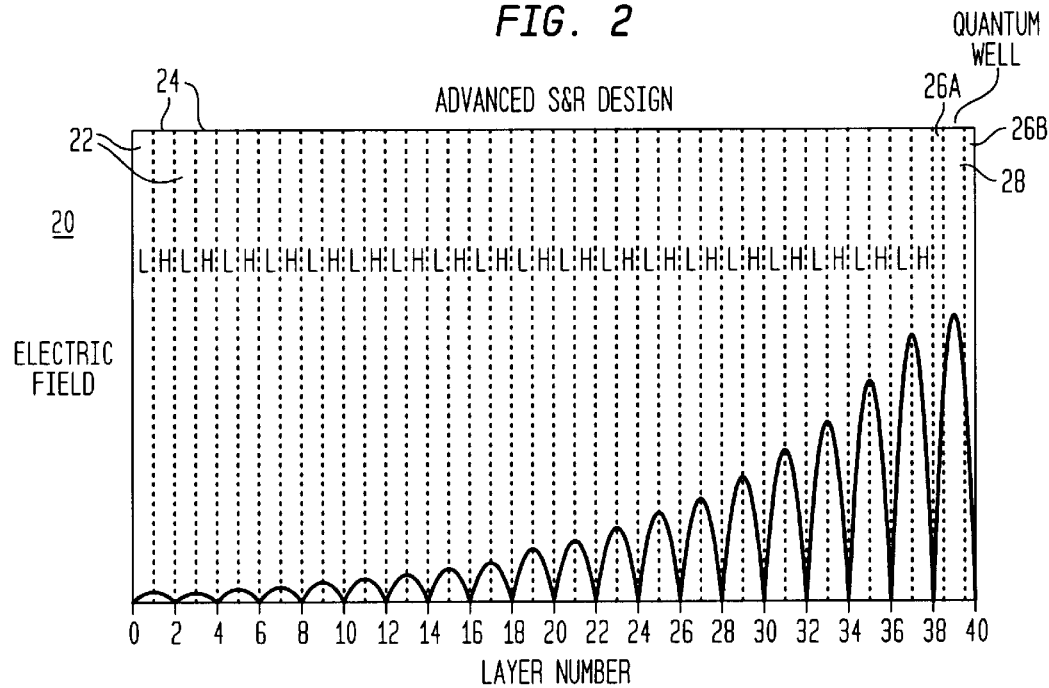

SATURABLE BRAGG REFLECTORS FOR USE IN MODE-LOCKING LASERS

FIELD OF THE INVENTION

This invention relates to semiconductive saturable absorbers, and more particularly, to such absorbers for use as Bragg reflector mirrors in mode-locked lasers, and to the resulting mode-locked lasers.

BACKGROUND OF THE INVENTION

Mode-locked lasers are particularly useful for the generation of ultrashort optical pulses, for example pulses of widths in the picosecond and subpicosecond range, and typically of high energy. Semiconductive saturable absorbers are advantageously employed in such mode-locked lasers as Bragg-reflector mirrors.

A saturable absorber absorbs all weak incident radiation but when the intensity of the radiation is built up to a sufficiently high level, termed the saturation intensity, the saturable absorber is bleached and becomes transparent, and then incident radiation is permitted passage with relatively low attenuation. A saturable Bragg absorber is a non-linear element that acts on incident radiation as a shutter whose opacity changes as a function of the intensity of the incident radiation at a particular wavelength. When used in a laser as a Bragg-reflector mirror, the saturable Bragg absorber acts in its opaque state as a low-loss reflector of the incident stimulated emission of the laser, and so can serve as one end wall of its resonant cavity.

U.S. Pat. No. 5,627,854 that issued to applicant W.H. Knox on May 6, 1997 describes a mode-locked laser in which the mode-locking element is a saturable Bragg reflector incorporating a quantum well within the one or more low-index layers the top of a stack advantageously of at least twenty of quarter optical path wave-length layers alternately of low and high index of refraction. The resulting non-linear reflector provides an intensity-dependent response that permits it to be used for saturable absorption directly in the main oscillating cavity of the laser.

In many applications the gain medium of the laser is quite small allowing the absorber material, the quantum wells, to be few in number, and in such applications the absorber material little influences the optical design of the dielectric Bragg-reflector mirror in which the absorber material is placed. However for a high gain laser where a large modulation depth is desired for the saturable Bragg reflector, the prior art saturable Bragg reflector design generally requires expanding the number of absorber layers that need to be incorporated, often to ten or more. In this case the absorber layer section becomes a significant factor in the mirror design and tends to introduce significant optical scattering because of the dielectric discontinuities introduced by the absorber layers. In fact when many quantum wells are placed inside the dielectric quarter optical path wavelength layers, there must be increased the total number of quarter wavelength layers and this leads to larger scattering penalties and non-optimized positioning of the quantum wells within the stack.

The present invention seeks a more efficient way of introducing the quantum well absorber layers into the saturable Bragg reflectors for use in mode-locked lasers.

SUMMARY OF THE INVENTION

We have discovered an improved form of saturable Bragg reflector for use in mode-locked lasers. In particular, in our new reflector, the top of the stack is modified by making preferably at least the two topmost high index layers of an optical thickness of one eighth of the operating (optical path) wavelength and locating a quantum well in the high index layer of optical thickness of one quarter the operating wavelength that is sandwiched between low index layers of one eighth the operating wavelength. It is found that the insertion of the quantum well, because of its relatively narrow width, little affects the effective optical thickness of the layer in which it is inserted so that in practice its presence in the layer can be discounted in preparing the thickness of such layer. Moreover this technique is scalable by the addition of similar one quarter wavelength layers with quantum wells sandwiched between one-eighth wavelength layers to achieve still deeper modulation depths for obtaining especially short pulse widths.

The invention will be better understood from the following more detailed description taken in conjunction with the accompanying drawing.

BRIEF DESCRIPTION OF THE DRAWING

FIG. 1 illustrates the layer structure of a prior art form of saturable Bragg reflector for use in a mode-locked laser.

FIG. 2 illustrates the layer structure of a saturable Bragg reflector that is an illustrative embodiment of the invention.

DETAILED DESCRIPTION

Figure 3:
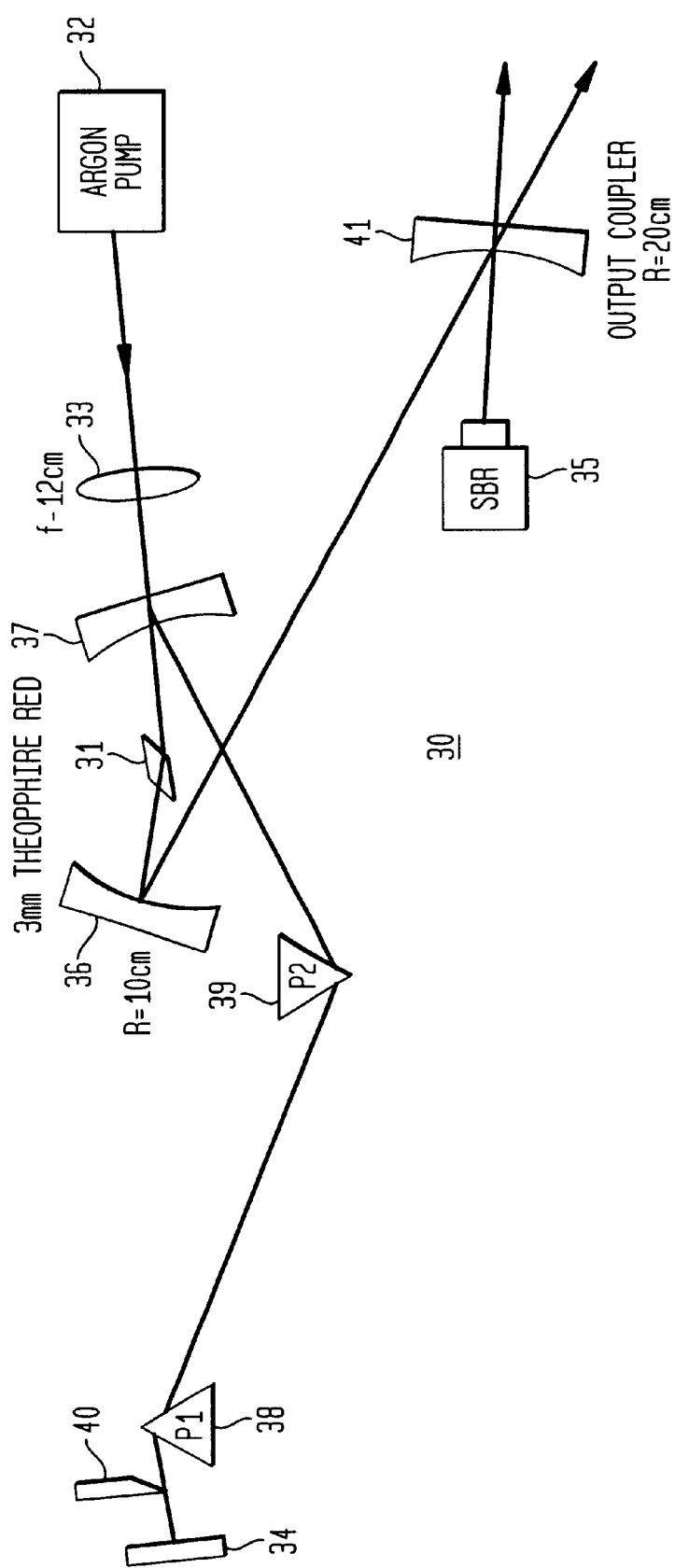
FIG. 3 is a schematic of a mode-locked laser typical of the kind in which the saturable Bragg reflector shown in FIG. 2 would be used.

With reference now to the drawing, FIG. 1 shows a cross section of a saturable Bragg reflector 10 typical of the prior art. It includes a monocrystalline substrate (not shown) of a compound semiconductor suitable for growing epitaxial layers therein, for example, gallium arsenide. Thereover there have been grown, typically by molecular beam epitaxy, a plurality, typically at least twenty, of essentially epitaxial layers, alternately layers 12 of a compound semiconductor of a relatively lower index of refraction and layers 14 of a compound semiconductor of a relatively higher index of refraction. Each of these layers has a thickness of approximately one quarter of the wavelength of the desired output light in the layer (optical thickness) so that the assembly serves as a dielectric mirror and is highly reflective of the light of the operating wavelength and will not saturate, as is needed for the role of a saturable Bragg absorber useful for mode locking a laser. To transform it to a saturable Bragg absorber, a quantum well denoted by QW of a suitable energy band gap is inserted into at least one of the layers of high index of refraction located at the top or near top of the stack.

Typical combinations of layers that can be used are as follows. For operation at a laser wavelength of about 850 nanometers, the high index layers can be AlGaAs, the low index layers can be AlAs, and the quantum well can be a layer of AlGaAs in which the mole fraction of the gallium is suitably higher than that in the high index layers. For operation at a laser wavelength of about 1.06 microns, the high index layers can be GaAs, the low index layers can be of AlAs, and the quantum well can be a layer of $In_{0.3}Ga_{0.7}As$.

FIG. 2 shows a cross section of a saturable Bragg reflector 20 in accordance with the invention, designed for mode-locking a laser operating at about 1.06 microns. It includes a monocrystalline gallium arsenide substrate on which have been grown epitaxially layers 22 of aluminum arsenide, a material of relatively low index alternating with layers 24 of gallium arsenide, a material of relatively high index. Each of the layers of low index has an optical thickness of approximately one quarter the operating wavelength and advantageously all but the last, or top two, layers 26A, 26B of high index have optical thicknesses of approximately one quarter of the operating wave-length. However, these last two layers 26A, 26B have an optical thickness of approximately an eighth of a wavelength. Moreover, the quantum well 28, which is a layer of about 100 Angstroms thick of a material of still lower index of refraction, such as InGaAs, is positioned advantageously near the center of the last layer of high index GaAs. Such a quantum well, being much thinner than the other layers, little affects the mirror design as has been documented earlier.

In some instances, for deeper modulation depths and narrower pulses it may be advantageous to include more than one such quantum well, in which case each one would be included separately in different topmost layers of the high index material and the adjacent low index layers would have their thicknesses reduced appropriately to about one-eighth the operating wavelength. Even in this case the extra layers should be too few in number to have a material effect on the mirror design.

FIG. 3 shows a saturable Bragg reflector (SBR) within the optical cavity of a solid state laser 30 for mode locking the laser. A Ti:Sapphire longitudinal rod 31 is pumped axially by argon laser 32. The Ti:Sapphire rod provides the optical gain for the mode-locked laser. Lens 33 is used for coupling the pump beam from argon laser 32 into the optical cavity. The main laser cavity is formed between a high-reflectivity mirror 34 and the saturable Bragg reflector 35. Mirrors 36 and 37 are used for directing the optical signals axially through rod 31 as the gain medium. Brewster prisms 38 and 39 provide adjustable negative and positive dispersion, which is used in known fashion for pulse shaping. A knife edge 40 is optionally disposed between mirror 34 and prism 38. The saturable Bragg reflector 35 is placed substantially at the focal point of a curved mirror 41. Output coupling of the optical pulses produced by the laser is provided through mirror 41 which is partially transmissive so that the desired pulse can exit when the saturable Bragg reflector 35 is in the bleached state.

Saturation of the saturable Bragg reflector mode locks the laser, which produces a mode-locked sequence of optical pulses. Pulsewidth is determined by dispersion and the bandwidth limiting properties of the saturable Bragg reflector 35. The laser described can be used to generate ultrashort optical pulses.

It should be noted that the dispersion compensation provided by the Brewster prisms 38 and 39 can be removed from the laser cavity, if desired. In this case, pulses of increased widths are obtained from the laser. Self-starting for the mode locking process is readily obtained because the saturation non-linearity is based upon the energy of the incident radiation, not its intensity. As a result, the use of saturable Bragg reflectors in mode-locked lasers provides advantages over a mode-locked laser employing pure Kerr lenses.

The illustrative laser described is designed specifically to facilitate pumping by way of light supplied for travel, primarily axially, through the laser rod. It should also be feasible to pump the laser by light supplied through the sidewalls of the layer rod. In particular, the gain medium may be a europium-doped optical fiber optically pumped.

It can be appreciated that the particular embodiments described are merely illustrative lustrative of the general principles of the invention and that various other embodiments will become apparent to a worker in the art. In particular, it is to be understood that various other material combinations may be used for fabricating a saturable Bragg reflector in accordance with the invention. For example, other Group III–Group V multilayer systems may be used, lattice matched to appropriate substrates. Some mismatching is tolerable where strained materials are grown over the substrate material. Additionally extension of the saturable Bragg reflector to semiconductor compounds in Group II–Group VI, and compounds of Group IV should also be feasible.

Moreover, it seems obvious that the invention may be used in forms of pulsed lasers in addition to those mentioned. Moreover, the principles described may be extended to self-tuning intensity dependent compound reflectors for self-starting and stable operation of a mode-locked laser of the kind described in our copending earlier application Ser. 09/016622, filed Jan. 30, 1998 (Cunningham Knox Case 37-28). Such a compound Bragg reflector includes a first inner section of moderate reflectance extending beyond the spectrum of desired lasing and a second outer section providing a higher reflectivity selectively in the spectral region of the desired lasing. In such a compound reflector the invention preferably would be used as the second outer section.

Additionally, as previously mentioned, in some instances it may be desirable to include additional pairs of layers of high index material of optical thicknesses of about one eighth the operating wavelength between each of which there is sandwiched a layer of low index of refraction of optical thickness of about a quarter wavelength in which is housed a quantum well of absorber material. Moreover, while it is generally preferable in most cases to use the very topmost low index layers for the quantum wells, in some special instances it may be appropriate to include additional layers in which case it is sufficient if the quantum wells be inserted in layers near the top of the stack.

What is claimed is:

1. A saturable Bragg reflector for use in mode locking a laser comprising:
    a multilayer stack including a plurality of epitaxial layers, the epitaxial layers being alternately of a semiconductor material having a low index of refraction and a semiconductive material of a high index of refraction, the layers of low index of refraction all having an optical thickness of approximately one quarter the operating wavelengths of the laser, the layers of low index of refraction except at least the top two of the stack having an optical thickness approximately a quarter wavelength of the operating wavelength, the said at least last two having an optical thickness of approximately one eighth of the operating wavelength, and a quantum well of absorber material being located in each of the layers of high index of refraction materials that are sandwiched between said one-eighth wavelength layers.

2. A saturable Bragg reflector in accordance with claim 1 in which the material of high index of refraction is GaAs and the material of low index of refraction is AlAs.

3. A saturable Bragg reflector in accordance with claim 2 in which the material of the quantum well is of InGaAs.

4. A saturable Bragg reflector in accordance with claim 1 in which the layers of high index of refraction are of aluminum gallium arsenide and the layers of low index of refraction are of aluminum arsenide.

5. A saturable Bragg reflector in accordance with claim 4 in which the quantum well in a layer of aluminum gallium arsenide in which the mole fraction of the gallium is less than in the aluminum gallium arsenide of the high index layer.

6. A mode-locked laser for generating an optical pulse at a design wavelength region comprising:

first and second end reflectors defining an optical cavity;

a gain medium positioned within the optical cavity and adapted to be pumped with pumping energy; and the first of said end reflectors being a saturable Bragg reflector and including a multilayer stack having a plurality of epitaxial layers of a compound semiconductor on a compound semiconductor substrate, the layers being in pairs of a material of low index of refraction and of a material of high index refraction, all of the layers of the compound of high index of refraction being approximately a quarter operating wavelength in optical thickness and all the layers, except at least the last two, of the material of low index of refraction having an optical thickness of approximately one quarter of the design operating wavelength, said at least last two having an optical thickness of approximately one eighth of the design operating wavelength, and a quantum well including an absorber in each layer of the material of high index of refraction sandwiched between said one eighth wavelength layers.

7. A laser in accordance with claim 6 in which the material of high index of refraction is GaAs and the material of low index of refraction is AlAs and the quantum well is a layer of InGaAs.

8. A saturable Bragg reflector for use in mode-locking a laser comprising:

a multilayer stack of layers, the layers being alternately of a semiconductor of low index of refraction and a semiconductor of high index of refraction, at least one of the layers of high index near the top of the stack including a quantum well as an absorber, the high index layers all having an optical thickness of approximately one quarter the operating wavelength of the laser, the low index layers, except those adjacent a layer of high index that includes a quantum well, also having an optical thickness of approximately one quarter the operating wavelength of the laser, the layers of low index that are adjacent a layer of high index that includes a quantum well having an optical thickness of one eighth the operating wavelength.

9. A saturable Bragg reflector in accordance with claim 8 in which only the top two of the layers of low index of the stack have an optical thickness of one eighth the operating wavelength.

10. A mode-locked laser including a resonant cavity for housing the gain medium having as one end reflector a saturable Bragg reflector in accordance with claim 8.

11. A mode-locked laser including a resonant cavity for housing the gain medium having as one end reflector a saturable Bragg reflector in accordance with claim 9.

12. A mode-locked laser in accordance with claim 10 in which the gain medium is an optical fiber.

* * * * *